(12) United States Patent
Lee et al.

(10) Patent No.: US 10,415,948 B2
(45) Date of Patent: Sep. 17, 2019

(54) TOUCH SENSOR

(71) Applicants: Kyung Yeon Lee, Seoul (KR); Chul Hee Lee, Seoul (KR)

(72) Inventors: Kyung Yeon Lee, Seoul (KR); Chul Hee Lee, Seoul (KR)

( * ) Notice: Subject to any disclaimer, the term of this patent is extended or adjusted under 35 U.S.C. 154(b) by 190 days.

(21) Appl. No.: 15/576,285

(22) PCT Filed: Jul. 6, 2016

(86) PCT No.: PCT/KR2016/007338
§ 371 (c)(1),
(2) Date: Nov. 22, 2017

(87) PCT Pub. No.: WO2017/007244
PCT Pub. Date: Jan. 12, 2017

(65) Prior Publication Data
US 2018/0149459 A1    May 31, 2018

(30) Foreign Application Priority Data

Jul. 7, 2015 (KR) .......................... 10-2015-0096737
Jul. 5, 2016 (KR) .......................... 10-2016-0085129

(51) Int. Cl.
*G01B 5/14* (2006.01)
*B33Y 50/02* (2015.01)

(52) U.S. Cl.
CPC ................ *G01B 5/14* (2013.01); *B33Y 50/02* (2014.12)

(58) Field of Classification Search
CPC ... G01B 11/2518; G01B 11/02; G01B 11/028; G01B 11/2509; G01B 11/2513; G01B 11/306

USPC .................................. 33/613, 503, 504, 645
See application file for complete search history.

(56) References Cited

U.S. PATENT DOCUMENTS

| | | | |
|---|---|---|---|
| 10,254,499 B1 * | 4/2019 | Cohen .................. | G02B 6/4463 |
| 10,331,265 B2 * | 6/2019 | Rosenberg ............ | G06F 3/0202 |
| 2013/0078625 A1 * | 3/2013 | Holmes .............. | G01N 35/0092 435/6.11 |
| 2013/0079599 A1 * | 3/2013 | Holmes ............... | G06F 19/3418 600/300 |

(Continued)

FOREIGN PATENT DOCUMENTS

| JP | 09-026302 A | 1/1997 |
|---|---|---|
| JP | 09-101105 A | 4/1997 |

(Continued)

*Primary Examiner* — Yaritza Guadalupe-McCall
(74) *Attorney, Agent, or Firm* — Patent Office of Dr. Chung Park

(57) ABSTRACT

The present invention relates to a touch sensor and, more particularly, to a touch sensor having a solenoid provided therein, wherein the touch sensor: after a plunger is pushed out of a main body case thereof when a detected start command is input, detects the plunger being pushed into the main body case by means of a detected object (bed) and generates a detection signal; and when a detection end command is input, allows the plunger to be pushed in, thereby removing hindering elements that arise and solving spatial limitations while 3D printing or operating machine tools. Also, the touch sensor is capable of carrying out a detecting function quickly and at a low power consumption and enables manpower to be reduced.

3 Claims, 9 Drawing Sheets

(56) References Cited

U.S. PATENT DOCUMENTS

| | | | |
|---|---|---|---|
| 2015/0159993 A1* | 6/2015 | Kocic | G01B 11/005 356/51 |
| 2015/0219452 A1* | 8/2015 | Bridges | G01B 21/042 33/503 |
| 2015/0292852 A1* | 10/2015 | Oki | G01B 21/042 33/502 |
| 2016/0116276 A1* | 4/2016 | Featherstone | G01B 21/047 33/503 |
| 2017/0182717 A1* | 6/2017 | Byun | B22F 3/008 |
| 2018/0111193 A1* | 4/2018 | Romano | B33Y 10/00 |
| 2018/0149459 A1* | 5/2018 | Lee | B33Y 50/02 |
| 2019/0073031 A1* | 3/2019 | Haslett | G01B 11/16 |

FOREIGN PATENT DOCUMENTS

| | | |
|---|---|---|
| JP | 10-239003 A | 9/1998 |
| JP | 2007-206047 A | 8/2007 |
| KR | 10-2013-0090635 A | 8/2013 |
| KR | 10-2015-0098340 A | 8/2015 |
| KR | 10-2016-0027666 A | 3/2016 |

\* cited by examiner

TOUCH SENSOR

TECHNICAL FIELD

The present invention relates to a touch sensor and, more particularly, to a touch sensor having a solenoid provided therein, wherein the touch sensor: after a plunger is pushed out of a main body case thereof when a detection start command is input, detects the plunger being pushed into the main body case by means of a detected object (bed) and generates a detection signal; and when a detection end command is input, allows the plunger to be pushed in, thereby removing hindering elements that occur while a 3D printer or a machine tool is operated, reducing the installation space and allowing the 3D printer or machine tool to be effectively operated.

BACKGROUND ART

A 3D printer or a machine tool according to the related art is required to exchange a tool of an end effector or attach a touch sensor including a device such as a servo motor, an actuator, a servo arm, a touch switch, a proximity sensor, and the like thereto to detect a horizontality or position of an object (or bed: hereinafter, referred to as an object).

FIG. 14 is a view showing a touch sensor for detecting a position or horizontality of an object of a 3D printer according to the related art, where the touch sensor includes a servo motor 55, a servo arm 56 and a touch switch 57 which are provided to a side surface of an end effector 50 of the 3D printer. To detect a position or a degree of horizontality of a detection object 90, the 3D printer operates the servo motor 55 of the touch sensor to allow the touch switch 57 formed on one end of the servo arm to face the detection object 90 positioned below the 3D printer. Then, the 3D printer moves the touch switch 57 or the detection object 90 in the direction that allows the gap between the touch switch 57 and the detection object 90 to be narrowed until a detection signal generated from the touch switch 57 is input thereto. When the detection signal is input, the 3D printer calculates the position of the sensing object 90. When the detection is terminated or an emergency occurs, the 3D printer operates the servo motor 55 to move upward the touch switch 57 formed on one end of the servo arm 56, thereby preventing the touch switch 57 from interfering with a next operation.

Meanwhile, the touch switch 57 generates the detection signal when the detection object 90 approaches the touch switch 57 while the detection object 90 makes contact with the touch switch 57 to be pressed so that the interval is less than a predetermined interval.

The above-described sequence of process is a function basically provided from a 3D printer or machine tool of the related art, where the degree of horizontality (slope) of the detection object is generally calculated as a measurement value of three points or more.

Thus, to employ an expensive automatic tool changer or an automatic detection device having a complex structure, the entire volume of the end effector 50 is increased so that the size of a possible output is relatively reduced, thereby causing spatial restriction, inefficiency and heat in the end effector and the bed (working table).

Specifically, some non-contact sensors used for solving the above-described problems require that the detection object is formed of only a specific material such as metal, and cause a serious error even in the case of a detection object made of a material such as metal or glass.

In recent years, although there has been grown a demand for an automatic detection function in order to speed up work, improve efficiency, and reduce labor force, there have been many difficulties in automation due to the above-described problems.

Meanwhile, a touch sensor or an end effector has been developed in various forms for the purpose of detecting the horizontality or position of an object in a 3D printer. A nozzle unit including an automatic leveler and a material cooling part has been disclosed in Korean Unexamined Patent Publication No. 10-2015-0098340. A 3D printer including a horizontal measurement sensor unit has been disclosed in Korean Unexamined Patent Publication No. 10-2016-0027666.

DISCLOSURE

Technical Problem

To solve the problems described above, one object of the present invention is to provide a touch sensor having a solenoid provided therein, where the touch sensor detects the plunger being pushed into the main body case by means of a detection object and generates a detection signal after a plunger is pushed out of a main body case thereof when a detection start command is input, and allows the plunger to be pushed therein when a detection end command is input, such that the touch sensor may be small in size and quickly perform the sensing function with low power consumption regardless of the material of a detection object.

Technical Solution

To achieve the above-described object, according to an aspect of the present invention, there is provided a touch sensor which includes a plunger formed on an upper end thereof with a permanent magnet; a main body case formed on one end thereof with a solenoid and formed on an opposite end thereof with a plunger guide configured to guide a movement of the plunger; a core positioned at a central portion of the solenoid to interact with magnetic force of the permanent magnet; a detector installed inside the main body case and configured to sense the plunger pushed into the main body case by a detection object; and a control device configured to receive or output a signal from or to an outside, receive a signal of the detector and drive the solenoid.

Advantageous Effects

According to the present invention, the touch sensor detects the plunger being pushed into the main body case by means of a detection object and generates a detection signal after a plunger is pushed out of a main body case thereof when a detection start command is input, and allows the plunger to be pushed therein when a detection end command is input, so that the touch sensor may be small in size, thereby overcoming the spatial restriction. In addition, the heat may be dissipated, the sensing function may be quickly performed with low power consumption regardless of the material of a detection object, and various effects such as labor force saving, and the like may be achieved.

DESCRIPTION OF REFERENCE NUMERAL

Figure 1:
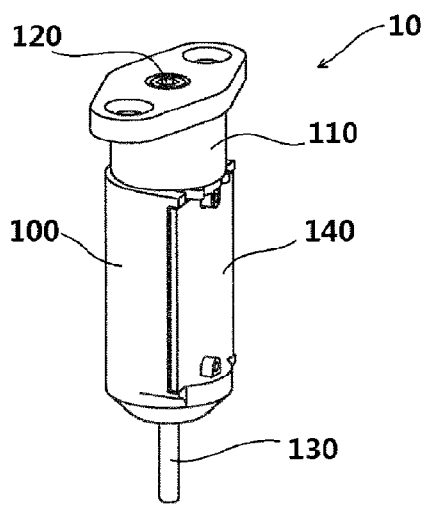
FIG. 1 is a perspective view illustrating a touch sensor according to an embodiment of the present invention.

10: Touch sensor
20: Control device
50: End effector
51: Nozzle
52: Heat block
55: Servo motor
56: Servo arm
57: Touch switch
80: Hexagonal wrench
90: Detection object
100: Main body case
101: Bobbin
102: Plunger guide
103: Bobbin hole
110: Solenoid
120: Core
130: Plunger
131: Permanent magnet
132: Elastic member
140: Control board
150: Detector
151: Photo interrupter 200: Control unit
210: Signal input/output unit
220: Solenoid driving unit
230: Detection unit
240: Status display unit

BEST MODE

Mode for Invention

Hereinafter, an embodiment of the present invention will be described in detail with reference to accompanying drawings as follows.

However, the dimensions, materials, shapes, relative arrangements and the like of the constituent parts described in the present embodiment are not intended to limit the scope of the present invention and are merely illustrative examples, unless otherwise specified.

Figure 2:
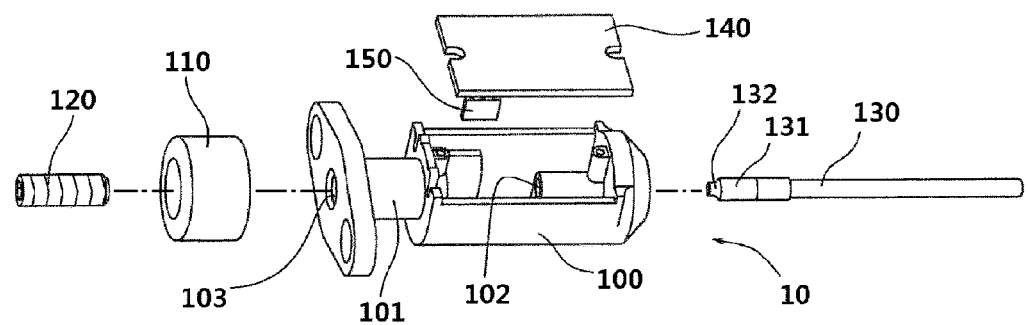
FIG. 2 is an exploded perspective view illustrating a touch sensor according to an embodiment of the present invention.
Figure 3:
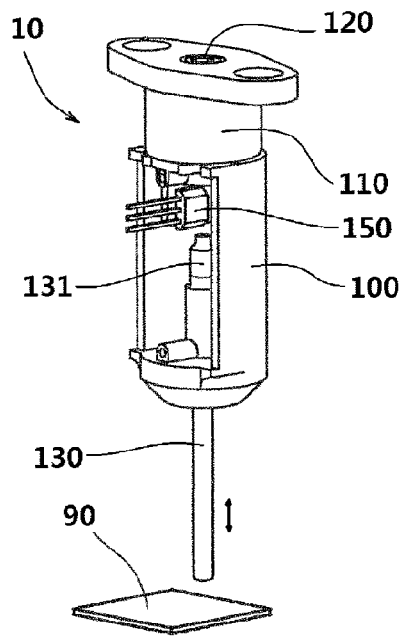
FIG. 3 is a view illustrating the internal operation of the touch sensor of FIG. 1.
Figure 4:
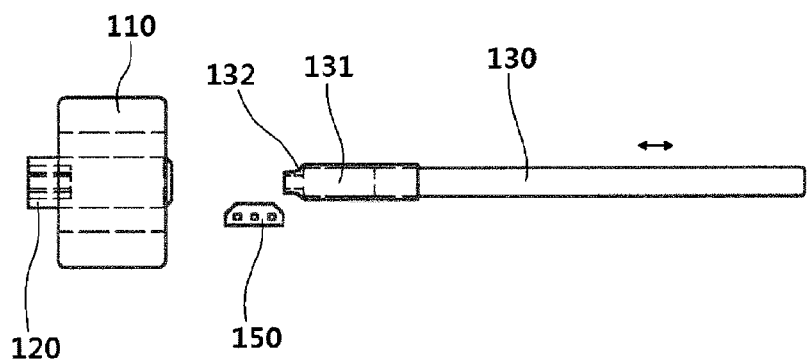
FIG. 4 is a view illustrating a state in which the plunger of a touch sensor according to an embodiment of the present invention is moved to an outside.
Figure 5:
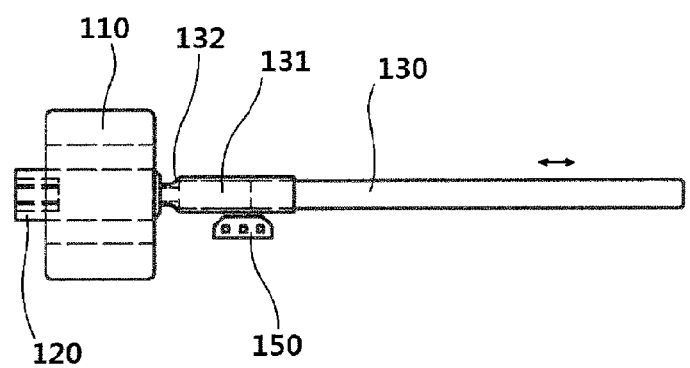
FIG. 5 is a view illustrating a state in which the plunger of the touch sensor of FIG. 4 enters the inside of the touch sensor.
Figure 6:
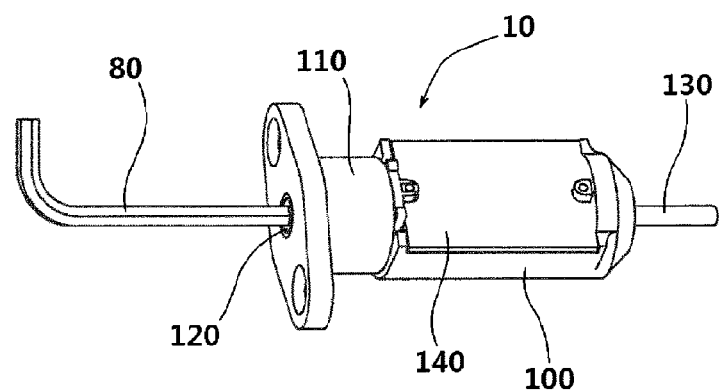
FIG. 6 is a view illustrating a position adjustment of a core of a touch sensor according to an embodiment of the present invention using a hexagonal wrench.
Figure 7:
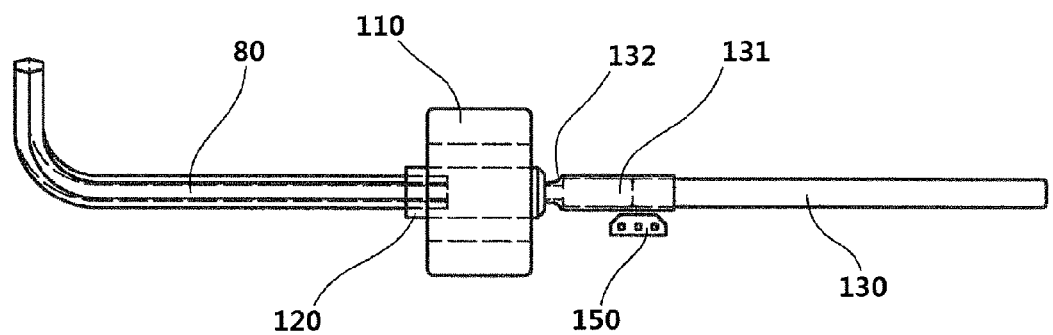
FIG. 7 is an internal detail view illustrating a state in which the core of the touch sensor of FIG. 6 is unlocked with a hexagonal wrench.
Figure 8:
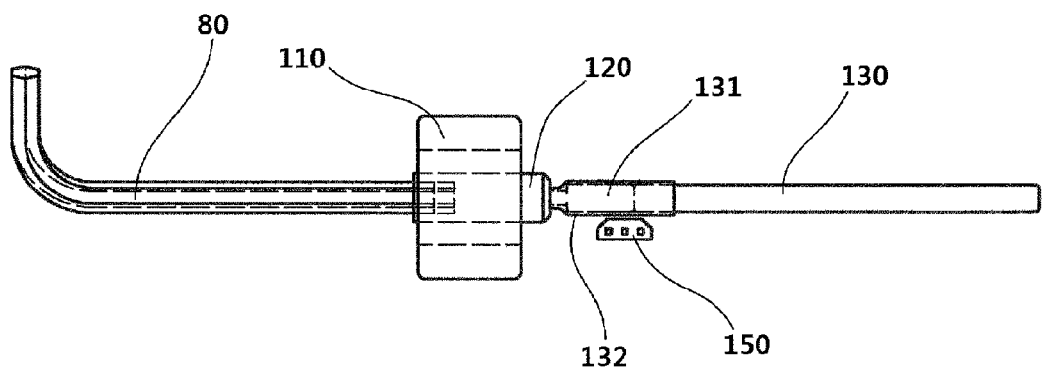
FIG. 8 is an internal detail view illustrating a state in which the core of the touch sensor of FIG. 6 is locked with a hexagonal wrench.
Figure 9:
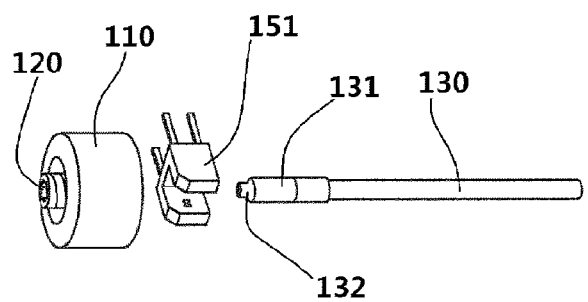
FIG. 9 is a view illustrating a touch sensor employing a photo interrupter as a detector according to an embodiment of the present invention.
Figure 10:
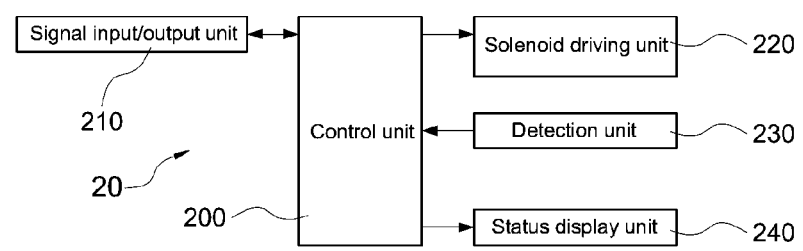
FIG. 10 is a block diagram illustrating a control device of a touch sensor according to an embodiment of the present invention.
Figure 11:
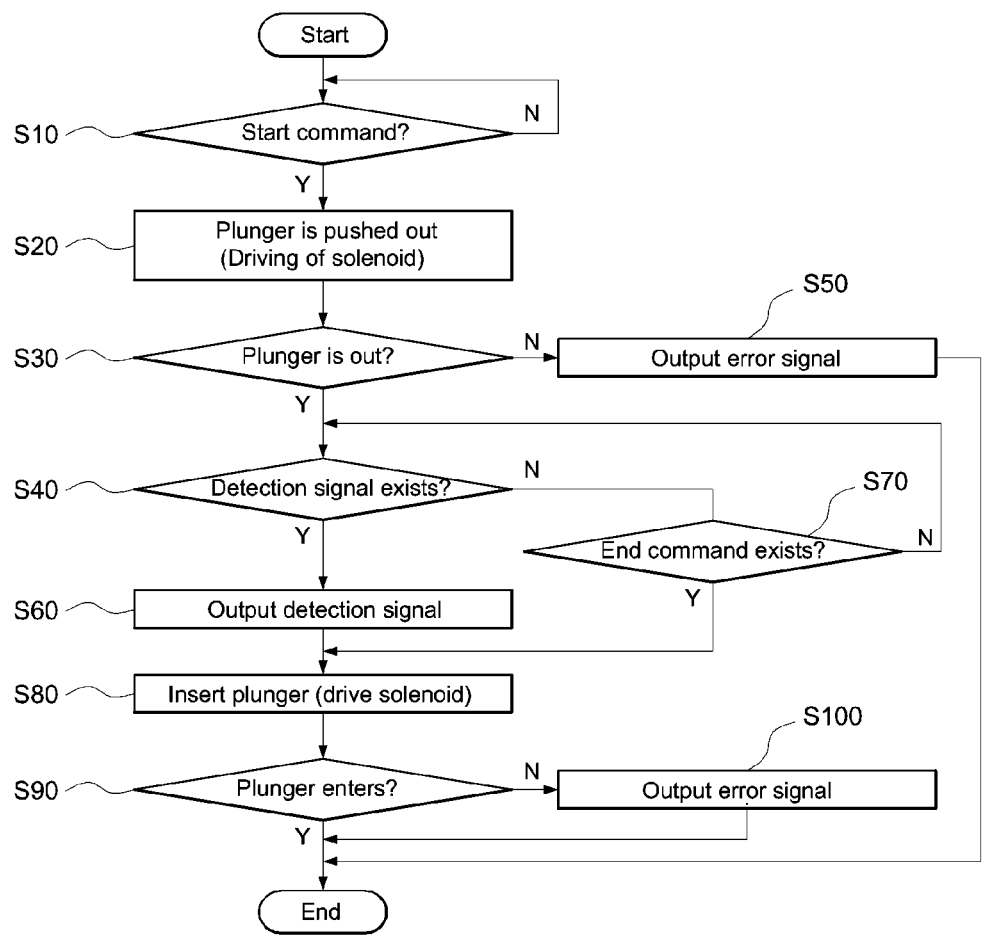
FIG. 11 is a flowchart illustrating the operation of a touch sensor according to an embodiment of the present invention.
Figure 12:
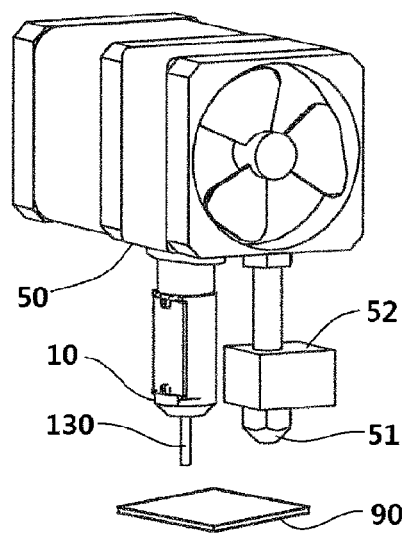
FIG. 12 is a view illustrating a case where a start command is issued by installing the touch sensor of FIG. 1 into a 3D printer.
Figure 13:
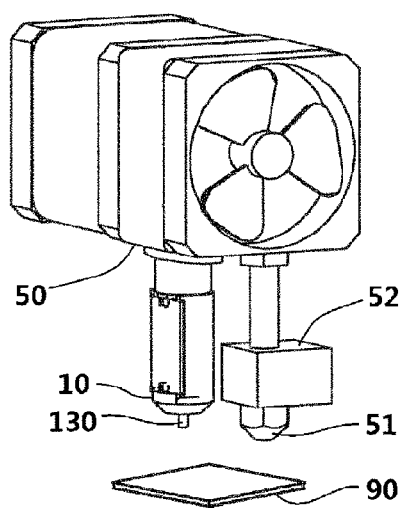
FIG. 13 is a view illustrating a case where an end command is issued by installing the touch sensor of FIG. 1 into a 3D printer.
Figure 14:
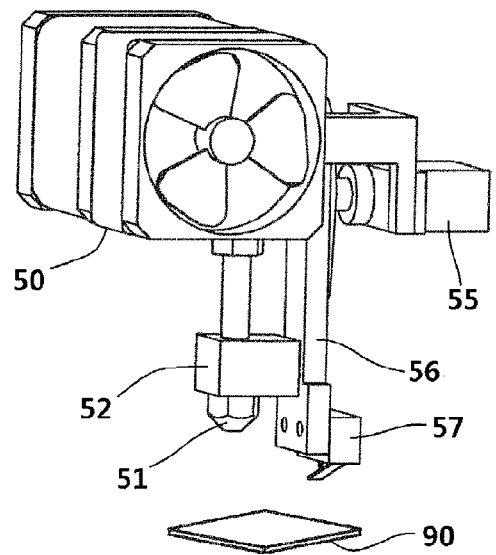
FIG. 14 is a view illustrating a state in which a touch sensor according to the related art is installed into a 3D printer.
Figure 15:
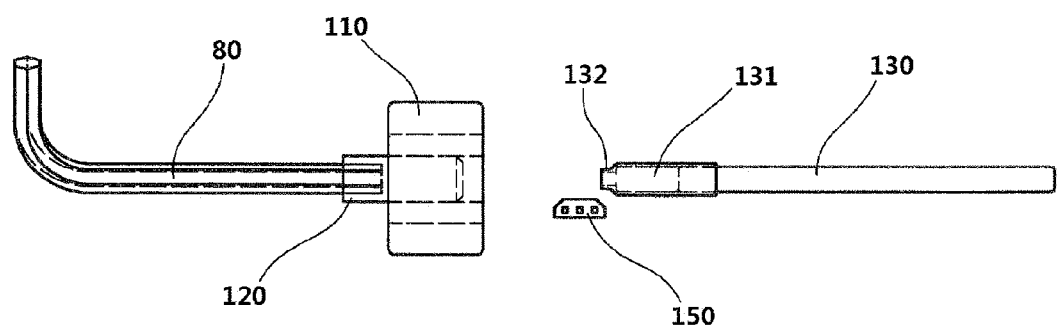
FIG. 15 is an internal detail view illustrating a state in which the core of the touch sensor of FIG. 7 when the core is further pulled out from the inside of the solenoid.
Figure 16:
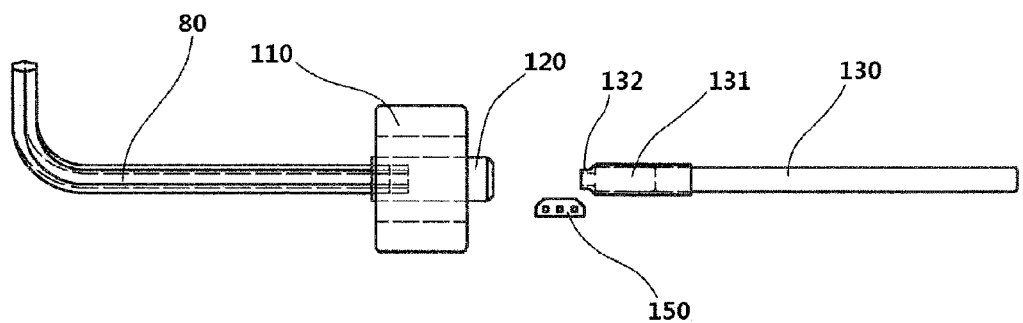
FIG. 16 is an internal detail view illustrating a state in which the core of the touch sensor of FIG. 7 is further inserted into the solenoid.

FIG. 1 is a perspective view illustrating a touch sensor according to an embodiment of the present invention. FIG. 2 is an exploded perspective view illustrating a touch sensor according to an embodiment of the present invention. FIG. 3 is a view illustrating the internal operation of the touch sensor of FIG. 1. FIG. 4 is a view illustrating a state in which the plunger of a touch sensor according to an embodiment of the present invention is moved to an outside. FIG. 5 is a view illustrating a state in which the plunger of the touch sensor of FIG. 4 enters the inside of the touch sensor. FIG. 6 is a view illustrating a position adjustment of a core of a touch sensor according to an embodiment of the present invention using a hexagonal wrench. FIG. 7 is an internal detail view illustrating a state in which the core of the touch sensor of FIG. 6 is unlocked with a hexagonal wrench. FIG. 8 is an internal detail view illustrating a state in which the core of the touch sensor of FIG. 6 is locked with a hexagonal wrench. FIG. 9 is a view illustrating a touch sensor employing a photo interrupter as a detector according to an embodiment of the present invention. FIG. 10 is a block diagram illustrating a control device of a touch sensor according to an embodiment of the present invention. FIG. 11 is a flowchart illustrating the operation of a touch sensor according to an embodiment of the present invention. FIG. 12 is a view illustrating a case where a start command is issued by installing the touch sensor of FIG. 1 into a 3D printer. FIG. 13 is a view illustrating a case where an end command is issued by installing the touch sensor of FIG. 1 into a 3D printer. FIG. 14 is a view illustrating a state in which a touch sensor according to the related art is installed into a 3D printer. FIG. 15 is an internal detail view illustrating a state in which the core of the touch sensor of FIG. 7 when the core is further pulled out from the inside of the solenoid. FIG. 16 is an internal detail view illustrating a state in which the core of the touch sensor of FIG. 7 is further inserted into the solenoid.

For reference, FIGS. 2, 4 to 9, 15 and 16 are views that are rotated counterclockwise by 90 degrees with respect to FIG. 1 for convenience.

Referring to FIG. 14, a touch sensor according to the related art includes a servo motor 55, a servo aim 56 and a touch switch 57 on a side surface of an end effector 50 of a 3D printer. To detect a position or a degree of horizontality of a detection object 90, the 3D printer operates the servo motor 55 of the touch sensor to allow the touch switch 57 formed on one end of the servo arm 56 to face the detection object 90 positioned below the 3D printer. Then, the 3D printer moves the touch switch 57 or the detection object 90 in the direction that allows the gap between the touch switch 57 and the detection object 90 to be narrowed until a detection signal generated from the touch switch 57 is input thereto. When the detection signal is input, the 3D printer calculates the position of the sensing object 90. When the detection is terminated or an emergency occurs, the 3D printer operates the servo motor 55 to move upward the touch switch 57 formed on one end of the servo arm 56, thereby preventing the touch switch 57 from interfering with a next operation.

Meanwhile, the touch switch 57 generates the detection signal when the detection object 90 approaches the touch switch 57 while the detection object 90 makes contact with the touch switch 57 to be pressed so that the interval is less than a predetermined interval.

As shown in FIGS. 1 to 11, a touch sensor 10 according to the present invention includes:

a plunger 130 formed on an upper end thereof with a permanent magnet 131;

a main body case 100 formed on one end thereof with a solenoid 110 and formed on an opposite end thereof with a plunger guide 102 configured to guide a movement of the plunger 130;

a core 120 positioned at a central portion of the solenoid 110 to interact with magnetic force of the permanent magnet 131;

a detector 150 installed inside the main body case 100 and configured to sense the plunger 130 pushed into the main body case 100 by a detection object 90; and a control device 20 configured to receive or output a signal from or to an outside, receive a signal of the detector 150 and drive the solenoid 110.

Hereinafter, the touch sensor 10 according to the present invention will be described with reference to FIGS. 3 to 5.

A 3D printer sends an object detection start command to the touch sensor 10 to allow the solenoid 110 of the touch sensor 10 to push the plunger 130 downward in order to acquire a degree of horizontality or position of the detection object 90. Thus, the touch sensor 10 or the detection object 90 is moved in the direction that allows the gap between the touch sensor 10 and the detection object 90 to be narrowed until a detection signal generated from the touch sensor 10 is input.

In this case, the plunger 130 enters the inside of the main body case 100 by the detection object 90 which pushes the plunger 130 up when making contact with an lower end of the plunger 130. When the plunger 130 enters the inside of the main body case 100 by a predetermined interval or more, the detector 150 detects the permanent magnet 131 formed on the upper end of the plunger 130 and provides the detection signal to the control device 20.

Preferably, the detector 150 includes a hall sensor for sensing a magnetic field of the permanent magnet 131, or a photo interrupter 150 configured to block light when the plunger 130 moves as shown in FIG. 9.

The plunger 130 may be pushed out of the main body case 100 or pulled into the main body case 100 by action force with the permanent magnet 131 in the direction of the current applied to the solenoid 110. For example, the action force acts as a force for pulling or pushing the permanent magnet 131 according to a pole generated by the solenoid 110 at a portion facing the permanent magnet 131.

In addition, when the plunger 130 enters the inside of the main body case 100 by a predetermined distance, the gap between the permanent magnet 131 and the core 120 becomes closer to each other, so that the permanent magnet 131 and the core 120 are attached to each other by the magnetic force of the permanent magnet 131. In this case, the plunger 130 may be suspended in the main body case 100 without any spring or power.

Meanwhile, current is applied to the solenoid 110 only for a predetermined time from the moment when the plunger 130 is pushed out or pulled up in the main body case 100. Thereafter, as described above, the plunger 130 is attached to the core 120 by the magnetic force of the permanent magnet 131 or is maintained by gravity in a state in which the plunger 130 is pushed out of the main body case 100.

Thus, the power consumption of the solenoid 110 may be greatly reduced and the problem of heat generation, which is generally caused in the solenoid, may be solved.

Preferably, the core 120 is formed of a ferromagnetic material which is attached well to the permanent magnet 131.

Referring to FIGS. 2 and 10, a control board 140 may include the control device 20 and the detector 150.

The control device 20 includes a signal input/output unit 210 for communicating with an outside, a solenoid driving unit 220 for controlling the solenoid 110, and a detection unit 230 for receiving a signal of the detector 150.

Preferably, the control device 20 may further include a status display unit 240 for displaying the position of the plunger 130 or with a self-test function and the status display unit 240 may display the self-test result.

Referring to FIGS. 6 to 8, 15 and 16, the core 120 may be further pushed into or pulled out of the solenoid 110 by using a tool such as a hexagonal wrench 80 or the like. When the distance between the core 120 and the permanent magnet 131 may be adjusted by moving the core 120, the magnetic force acting between the solenoid 110, the core 120 and the permanent magnet 131 may be controlled.

In addition, as shown in FIGS. 2 and 3, the touch sensor 10 according to the present invention may include an elastic member 132 formed on an upper end of the permanent magnet.

The elastic member 132 has a buffering function and a noise reduction function when the plunger 130 moves rapidly into the main body case 100 and collides with the core 120.

In addition, the elastic member 132 allows the core 120 and the permanent magnet 131 to be spaced apart from each other and weakens the magnetic force acting between the core 120 and the permanent magnet 131, such that the permanent magnet 131 hanged on the core 120 is separated from the core 120 only by a slight repulsive force (pushing force) of the solenoid 110.

Preferably, although the elastic member 132 according to an embodiment of the present invention is formed on the upper end of the permanent magnet 131, the present invention is not limited thereto. Alternatively, the elastic member 132 may be formed on the lower end of the core 120, or may be formed at a predetermined position between the core 120 and the permanent magnet 131.

The touch sensor 10 according to the present invention will be described with reference to FIG. 11.

First, in step S10, the touch sensor determines whether the detection start command is generated from the 3D printer. The start command is input by the signal input/output unit 210 of the control device 20. In this case, if it is determined that the detection start command is not generated, the touch sensor 10 waits while repeating step S10. To the contrary, if it is determined that the detection start command is generated, the operation goes to a next step.

Next, in step S20, the solenoid 110 is driven for a predetermined time to push the plunger 130 out of the main body case 100.

In step S30, it is determined whether the plunger 130 is out. That is, it is confirmed that the command of step S20 is exactly executed. If it is determined that the plunger 130 is not out, the operation goes to step S50 so that the operation is terminated after an error signal is output. If the plunger 130 is out, the operation goes to step S30.

Then, in step S40, it is determined whether the detection signal of the detector 150 generated while the plunger 130 enters the main body case 100 by the detection object 90 exists. If the detection signal is not generated, the operation goes to step S70. If the detection signal is generated, the operation goes to the next step.

Then, in step S60, the detection signal is output through the signal input/output unit 210 of the control device 20. The 3D printer receives the detection signal output in step S60.

Then, in step S70, it is determined whether there is an end command generated from the 3D printer in the case of detection end or emergency. If the end command is not generated, step S40 is repeatedly executed. If the end command is generated, the operation goes to step S80.

In step S80, the solenoid 110 is driven for a predetermined time to end the sensor operation and the plunger 130 is inserted into the main body case 100.

In step S90, it is determined whether the plunger 130 is inserted into the main body case 100. If the plunger 130 is not inserted into the main body case 100, the operation goes to step S100 and is terminated after an error signal is output. If the plunger 130 is inserted into the main body case 100, the operation is immediately terminated.

Referring to FIG. 12, when the detection start command according to the present invention is issued to the touch sensor 10, the plunger 130 is pushed down further than the nozzle 51 installed in the end effector 50. When the touch sensor 10 and the detection object 90 approach each other, the plunger 130 contacts the detection object 90 before the nozzle 51 to sense the detection object 90.

Referring to FIG. 13, when the detection end command is issued to the touch sensor 10 according to the present invention, the plunger 130 is prevented from obstructing the next operation by inserting the plunger 130 above the nozzle 51.

Preferably, the start command that signals the beginning of detection may be implemented with an arbitrary or predetermined signal. For example, a servo motor 55 control signal that allows the touch switch 57 to face the sensing object 90 among servo motor 55 control signals used in the conventional servo motor 55 of FIG. 14 may be prescribed as the detection start command of the present invention.

Preferably, the end command that signals the end of detection may be implemented with an arbitrary or predetermined signal. For example, a servo motor 55 control signal that operates the servo motor 55 to move up the touch switch 57 to prevent the touch switch 57 from interfering with the next operation among servo motor 55 control signals used in the conventional servo motor 55 of FIG. 14 may be prescribed as the detection end command of the present invention.

According to the present invention, the touch sensor 10 may detect the plunger being pushed into the main body case by the detection object and generate the detection signal after the plunger is pushed out of a main body case thereof when the detection start command is input, and allows the plunger to be pushed therein when the detection end command is input, such that the touch sensor may be small in size and have low power consumption regardless of the material of a detection object. In addition, the spatial restriction may be removed.

INDUSTRIAL APPLICABILITY

According to the present invention, the touch sensor 10 is small in size and may quickly perform the sensing function with low power consumption regardless of the material of a detection object. In addition, the touch sensor 10 may have various effects such as improvement of the quality of an output product of a 3D printer or a machine tool, reducing labor force and the like.

The invention claimed is:

1. A touch sensor comprising:
   a plunger formed on an upper end thereof with a permanent magnet;
   a main body case formed on one end thereof with a solenoid and formed on an opposite end thereof with a plunger guide configured to guide a movement of the plunger;
   a core positioned at a central portion of the solenoid to interact with magnetic force of the permanent magnet;
   a detector installed inside the main body case and configured to sense the plunger pushed into the main body case by a detection object; and
   a control device configured to receive or output a signal from or to an outside, receive a signal of the detector and drive the solenoid.

2. The touch sensor of claim 1, further comprising an elastic member formed on an upper end of the permanent magnet or a lower end of the core.

3. The touch sensor of claim 1, wherein the core is configured to be further inserted into or withdrawn from an inside of the solenoid.

* * * * *